United States Patent

Studer

[11] Patent Number: 4,616,931
[45] Date of Patent: Oct. 14, 1986

[54] PROCESS AND DEVICE FOR THE CONTACT FREE DETERMINATION OF THE MOVEMENT OF AN OBJECT

[75] Inventor: Urs-Peter Studer, Riehen, Switzerland

[73] Assignee: Zumbach Electronic AG, Orpund, Switzerland

[21] Appl. No.: 549,507

[22] Filed: Nov. 7, 1983

[30] Foreign Application Priority Data

Nov. 12, 1982 [CH] Switzerland ............... 6600/82

[51] Int. Cl.$^4$ ............................................. G01B 11/14
[52] U.S. Cl. ........................................ 356/373; 356/27
[58] Field of Search .................................. 356/28, 373

[56] References Cited

U.S. PATENT DOCUMENTS 3,888,589 6/1975 Swift ..................................... 356/28
4,273,430 6/1981 Fritsche et al. ........................ 356/28

FOREIGN PATENT DOCUMENTS 0172254 10/1982 Japan ................................... 356/28
2043387 10/1980 United Kingdom ................. 356/28

Primary Examiner—R. A. Rosenberger
Assistant Examiner—Crystal D. Cooper

[57] ABSTRACT

An image of a moving object with an optically differentiatable structure is projected onto a grid of opto-electric transducers through a lens. The output signals of at least one square group of four transducers A–D are processed to produce from output signals of the respective transducers a pair of signals $I = A + B - C - D$ and $II = B + C - A - D$. The nature of the object is such as to cause periodically varying signals in the transducers, and there are thus concerned two signals shifted by a quarter period, from which the direction of movement can be determined by means of a logic circuit. From the frequency of the signals the velocity can be ascertained. By means of direction dependent counters the path of the object can be determined from the signals. With a two dimensional matrix of transducers measurements can be effected of movement of the object in different directions. The measurement is simple and offers versatile possibilities of exploitation.

6 Claims, 10 Drawing Figures

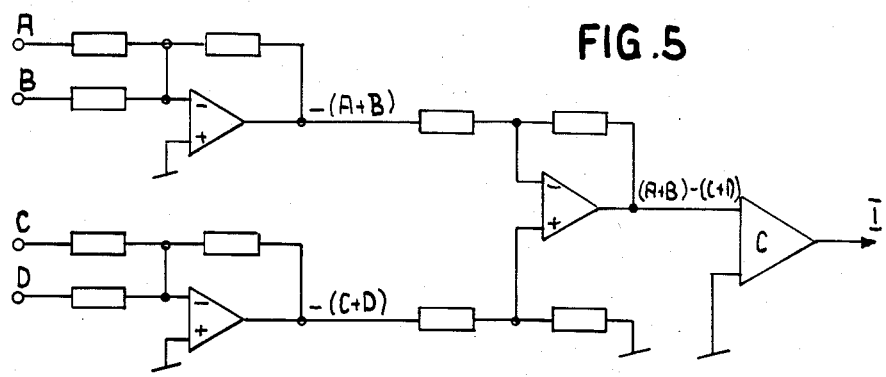
FIG.5
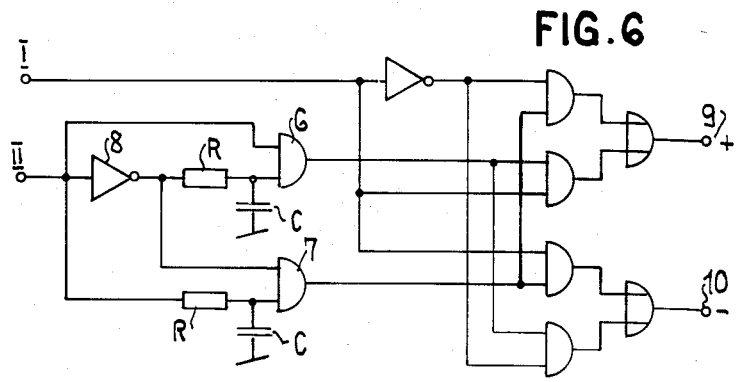
FIG.6
FIG.7a
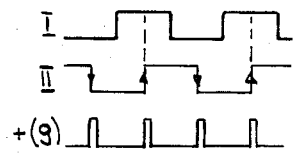
FIG.7b
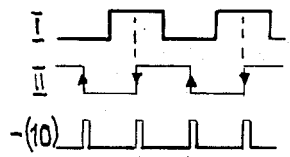
FIG.8
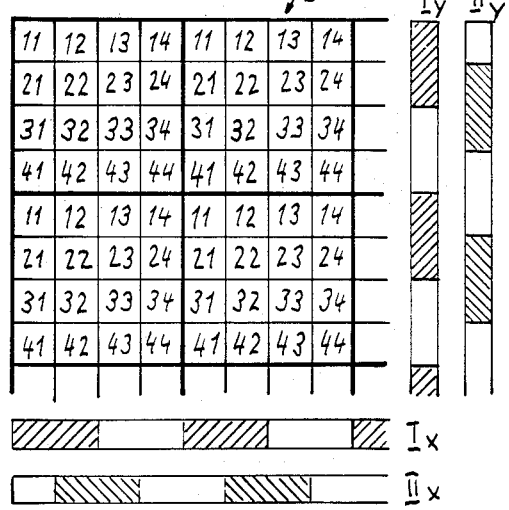

4,616,931

PROCESS AND DEVICE FOR THE CONTACT FREE DETERMINATION OF THE MOVEMENT OF AN OBJECT

BACKGROUND OF THE INVENTION

The present invention concerns a process for the contact free determination of the movement of an object with optically differentiatable structure. Processes and devices for this purpose are known in which, in general, relatively expensive optical systems with fixed and movable grids and rasters of prisms are necessary. In spite of this the known systems only enable a relatively exact measurement of velocity but do not allow an indication to be obtained in respect of the direction of movement and hence in respect of the path traversed by the object, insofar as the movement does not always occur in the same direction.

SUMMARY OF THE INVENTION

It is the object of the present invention to provide a process and a device which not only permits the determination of the movement of an object with simple optical means, but also enables the direction of movement to be determined and thus for many cases allow a sufficiently exact indication in respect of the path traversed by the object.

In accordance with the invention this object is achieved by a process including the steps of projecting a light image of the object onto a grid of opto-electric transducers, selecting output signals from respective ones of at least one group of said transducers, combining said output signals in different combinations to produce resultant signals which vary periodically with the movement of the object but are respectively phase shifted, and comparing said respectively phase shifted signals to determine the direction of movement of the object in at least one dimension.

Preferably groups of four transducers each are provided for each component of movement to be determined, from which transducers phase shifted signals are derived from whch the magnitude and direction of the movement can be determined.

The invention further provides a device for carrying out the process and including a row or matrix of photodiodes, hereinafter designated diodes for brevity, provided as transducers, the diodes of corresponding position in each group being connected in parallel.

BRIEF DESCRIPTION OF THE DRAWINGS

FIG. 5 is a diagram of a circuit for the production of the signals shown in FIG. 4, FIG. 6 is a diagram of a logic circuit for the processing of the signals to determine the direction of movement of the object, FIGS. 7a and 7b are diagrams showing input and output signals occurring in the circuit according to FIG. 6, and FIG. 8 shows diagrammatically a transducer matrix for the determination of two components of movement.

DETAILED DESCRIPTION OF PREFERRED EMBODIMENTS OF THE INVENTION

Figure 1:
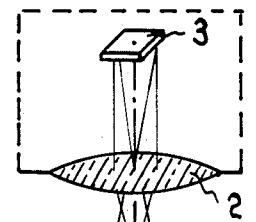
FIG. 1 shows diagrammatically the general arrangement of a measuring device in accordance with the invention.

FIG. 1 shows how an image of a flat object 1 that is movable in the plane XY is projected onto an opto-electric tranducer 3 through a diagramatically illustrated lens 2. Since it is desired to ascertain the movement of the object 1 in both directions XY, the transducer 3 illustrated in FIG. 1 is constructed as a square diode matrix of the kind shown in FIG. 8. This matrix is shown in FIG. 1 as if it were projected onto the object 1. The diodes are secured together in square groups of 16 diodes. It will be described briefly later below how a measurement can be effected of speed or movement having two components of direction.

Figure 2:
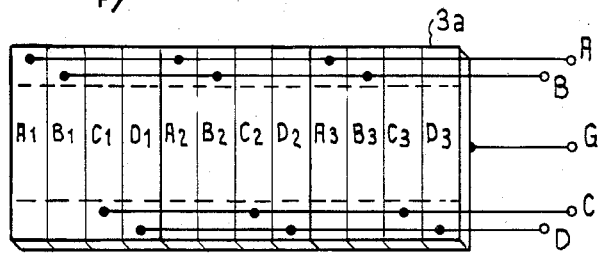
FIG. 2 is a diagrammatic view of a part of the apparatus of FIG. 1, showing a row of diodes as opto-electric transducers for one component of movement.
Figure 3:
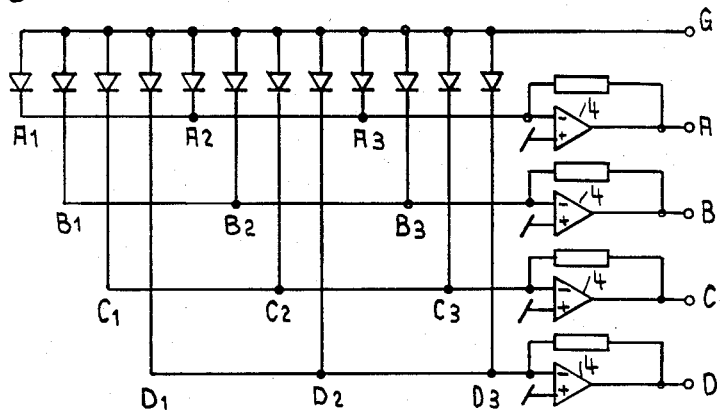
FIG. 3 shows a circuit including the transducers of FIG. 2 with pre-amplifiers.
Figure 4:
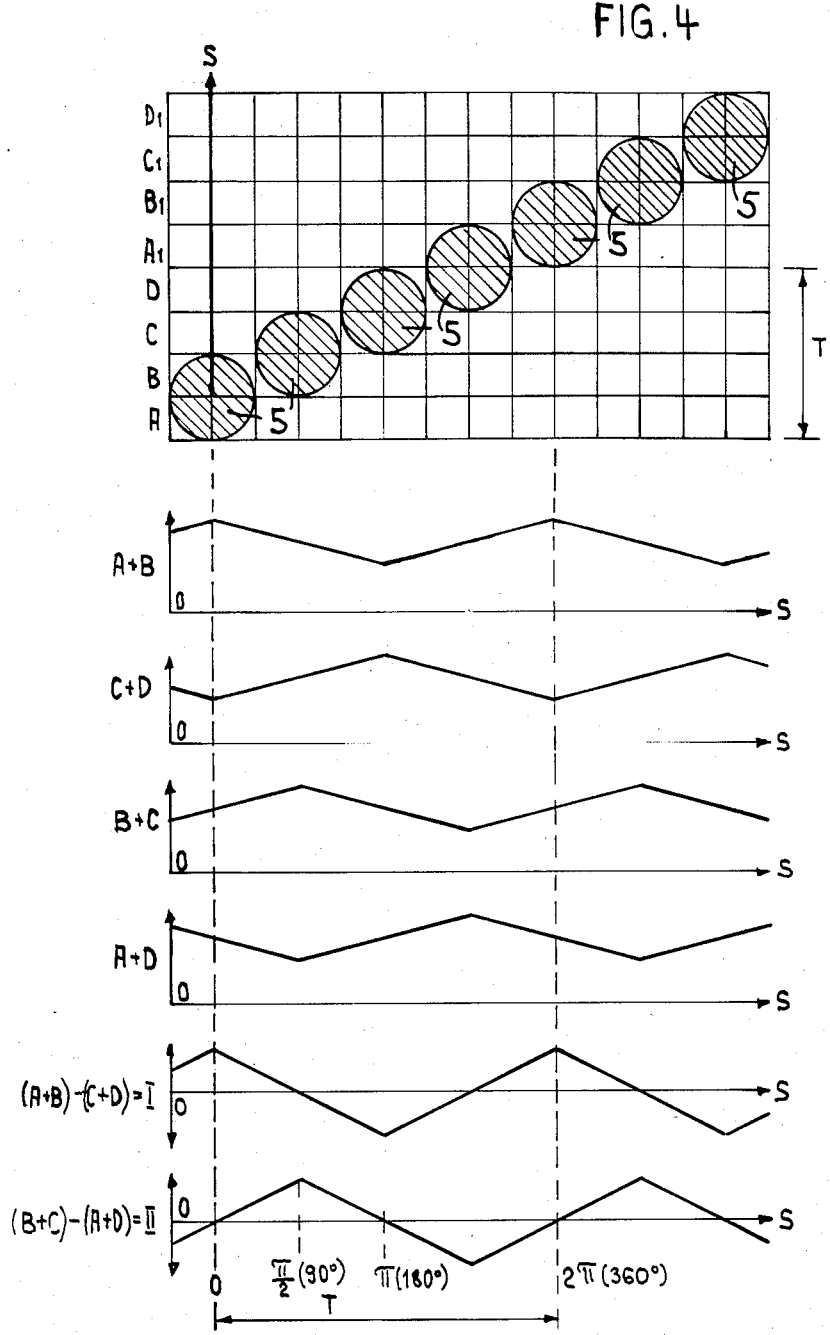
FIG. 4 is a diagram illustrating different signals that can be derived from the circuit of FIG. 3 as a function of the movement of a spot of light longitudinally of the row of transducers.

For the explanation of the principle of the invention there will however be described beforehand with the aid of FIGS. 2 to 7 a more simple example for the determination of the speed or the movement of an object in one direction. The measuring device is constructed in the same manner as that of FIG. 1, except that in place of the diode matrix 3 there is a row 3a of diodes as shown in FIG. 2. This row of diodes lies parallel to the direction to be sensed, for example the direction X, that is to say that the image point of the object 1 moving in front of the lens 2 traverses the row of diodes in the longitudinal direction. Image points of different brightness thereby produce variable signals in the diodes, each point or signal traversing the row of diodes at a velocity that is proportional to the velocity of the object. There thus occur in a manner known per se pulses of a periodic signal of which the frequency is proportional to the velocity of the object and inversely proportional to the width of each diode. As is indicated in FIG. 2 and is shown in FIG. 3 the diodes of the row are connected in groups of four consecutive diodes A, B, C, D, all diodes A, all diodes B, all diodes C and all diodes D being respectively connected in parallel. There thus exist four outputs A, B, C, D, each of which contain an operational amplifier 4. The outputs of FIG. 3 are connected with adding and subtracting circuits according to FIG. 5, of which only one is shown. The construction and operation of the circuit of FIG. 5 is immediately apparent and will thus not be further explained herein.

At the output I there occurs the following signal I:

$$I=(A+B)-(C+D)$$

A second identical circuit at whose inputs are applied the signals in the order B, C, A, D, supplies the following signal:

$$II=(B+C)-(A+D)$$

Thus, in one channel for each respective group of diodes the signals of the two first diodes A and B are added and there is formed the difference from the sum of the signals of the two last diodes C and D.

Considering the course of an image point or a spot of light or shadow over a group of diodes A–D as a period of 360° or $2\pi$ it will immediately be appreciated that then the signals A+B and C+D are of opposite phase. From the difference of these signals there can be eliminated components such as for example the mean brightness of the section of the object under consideration, which are not produced as a result of the progress of image points. One thus obtains a signal which comprises only the frequency proportional to the velocity of movement to be determined. The same applies for the signal II, which, however, is shifted relatively to the above described period by 90° or $\pi/2$. These relationships are apparent from FIG. 4, wherein there is plotted upwardly in the vertical direction the running time of an image point or the longitudinal direction of the row of diodes, while in the horizontal direction there are shown different positions of a light point 5 traversing the row of diodes. It is thus clear that for the first lower left position of the light point the signal A+B is at a maximum, the signal C+D is at a minimum, the signal B+C has a middle value and the signal A+D likewise has a middle value. For the second position from the left of the image or light point the signals A+B and C+D are at a middle value, whereas the signal B+C has a maximum value and the signal A+D a minimum value. It can clearly be seen that the four signals thus described each have a periodic course, but are phase shifted. Each of the signals A+B and C+D as well as the signals B+C and A+D are oppositely phased. The subtraction of these oppositely phased signals yields signals of equal frequency and doubled amplitude, whereby the above-mentioned interference signals are eliminated. Of course, for the simplification of the description these interference signals are not described in addition to the signals A+B, C+D, B+C and A+B.

In this manner one obtains at the outputs I and II of the circuits according to FIG. 5 the phase shifted signals illustrated in FIG. 7, which are likewise indicated by I and II. These signals are fed to the inputs of the logic circuit according to FIG. 6. Since all circuit elements of this circuit are clearly shown a description of this circuit and its function is rendered unnecessary. Suffice it to say that the AND-gates 6 and 7 with the respective RC-inputs and the inverter 8 respectively produce in response to a rising or descending flank of the signal II an output impulse of relatively shorter duration until the condenser C is charged, which with the usual logic determines whether a series of impulses according to FIG. 7 appears at the output 9 or at the output 10. The designations "+" and "−" at the outputs 9 and 10 indicate that a series of impulses at the output 9 indicates the forward direction and a series of impulses at the output 10 indicates the backwards direction. The two signals I and II shifted by a quarter period permit the differentiation between forwards and backwards through the logic circuit according to FIG. 6, in that in the forward condition (+) impulses occur with the signal II descending and the signal I low and with the signal II climbing and the signal I high. In the backward condition (−) there occur on the contrary impulses with the signal II climbing whilst the signal I is low and with the signal II descending whilst the signal I is high. As described impulses thus occur during a defined direction of movement only at one output 9 or 10, and these impulses show not only the direction of movement as a result of their presence, but also the velocity of movement as a result of their frequency. In a forward and backward counter not illustrated, the impulses appearing at the output 9 could be added and the impulses appearing at the output 10 subtracted, so that the state of the counter allows information in respect of the total path of the object. In a further circuit, not illustrated and known per se the instantaneous velocity of the object can be ascertained from the respective impulse frequency either of a signal I or II or of a signal at one of the outputs 9 or 10. It is also possible to determine the direction and magnitude of the movement of the object magnitude being taken to mean either the momentary velocity or the total movement or path from a determined point in time. Naturally, average values for the determination of an average speed could also be derived.

Whilst in FIG. 2 only three groups of four diodes each are shown, in practice essentially longer rows of diodes are used which are correspondingly connected in groups of four.

For the embodiment according to FIG. 8 with a diode matrix it will simply be explained that the diodes respectively indicated therein with the same reference numerals are connected together. In accordance with the above description correspondingly phase shifted regions are evaluated both in the X direction and also in the Y direction, in order to yield phase shifted signals $I_x$ and $II_x$ or $I_y$ and $II_y$, with the aid of which components of movement can be determined according to magnitude and direction. The calculation is as follows:

$$I_X=[(11+21+31+41)+(12+22+32+42)]-[(13+23+33+43)+(14+24+34+44)]$$

$$II_X=[(12+22+32+42)+(13+23+33+43)]-[(11+21+31+41)+(14+24+34+44)]$$

$$I_Y=[(11+12+13+14)+(21+22+23+24)]-[(31+32+33+34)+(41+42+43+44)]$$

$$II_Y=[(21+22+23+24)+(31+32+33+34)]-[(11+12+13+14)+(41+42+43+44)]$$

I claim:

1. A process for the contact-free determination of the movement in at least one dimension of an object of optically differentiatable structure, including the steps of providing a grid of opto-electric transducers comprising at least one group of four similar opto-electric transducers forming a row extending in one of said dimensions, projecting a light image of the object onto said grid of opto-electric transducers, whereby each of said for transducers produces a signal A to D, deriving from each group of four opto-electric transducers two phase-shifted signals I and II which vary priodically with a frequency determined by the speed of said object as follows:

$$I=(A+B)-(C+D)$$

and $$II=(B=C)-(D+A)$$

determining said speed from said frequency and determining the direction of said movement of said object from the phase of said signals.

2. A process according to claim 1, wherein the signals I and II are developed as periodic rectangular wave signals and are applied to a logic circuit in which the direction of movement is evaluated.

3. A process according to claim 2, wherein a path measurement is effected by counting of periods derived from at least one said periodic signals.

4. A process according to claim 1, wherein a matrix of transducers is provided as the said grid and said output signals are selected from groups of transducers extending along the two axes of the matrix to derive signals for the determination of the magnitude and direction of two components of movement.

5. A device for the contact-free determination of the movement in at least one dimension of an object of optically differentiatable structure, comprising a grid of opto-electric transducers, this grid comprising at least one group of similar opto-electric transducers forming a row in an order A to D extending in one of said dimensions, periodic signals being induced in each of said transducers of which the frequency depends on the speed of the movement of said object, and the signals from the transducers of one group being phase-shifted relatively to each other, an adding and subtracting circuit adapted for forming phase-shifting signals at said frequency as follows:

$$I=(A+B)-(C+D)$$

and $$II=(B+C)-(D+A)$$

from respective output signals A to D of said transducers, and a logic circuit for comparing said phase-shifted signals I and II to determine the direction of said movement of the object in said at least one dimension, and means for detecting the speed of said movement of said object from the frequency of said signals.

6. A device according to claim 5, with a matrix of photodiodes containing said groups of diodes extending respectively along two axes of the matrix, and wherein the output signals from the groups of diodes extending along one axis serve for the determination of movement of the object in the direction of one coordinate and the output signals from the groups of diodes extending along the other axis serve for the determination of the movement in the direction of the other coordinate.

* * * * *